(No Model.)
E. DEDERICK.
DRIVING MECHANISM FOR CARS.
No. 354,889. Patented Dec. 28, 1886.
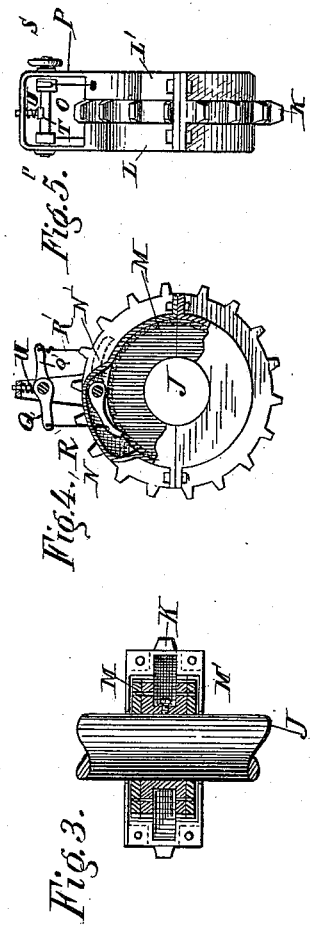
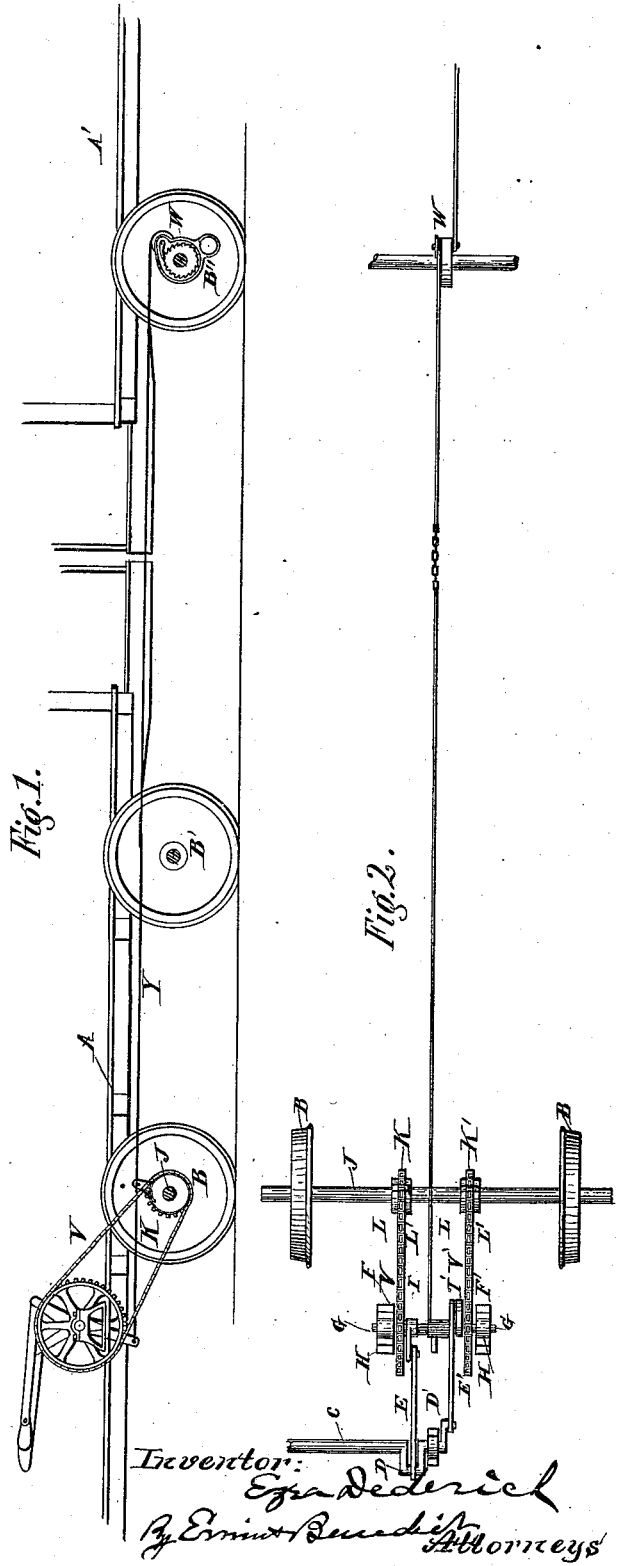

UNITED STATES PATENT OFFICE.

EZRA DEDERICK, OF MILWAUKEE, WISCONSIN.

DRIVING MECHANISM FOR CARS.

SPECIFICATION forming part of Letters Patent No. 354,889, dated December 28, 1886.

Application filed July 24, 1886. Serial No. 208,993. (No model.)

*To all whom it may concern:*

Be it known that I, EZRA DEDERICK, of Milwaukee, in the county of Milwaukee and State of Wisconsin, have invented new and useful Improvements in Driving Mechanism for Cars or Wagons; and I do hereby declare the following to be a full, clear, and exact description of said invention, reference being had to the accompanying drawings, and to the letters or figures of reference marked thereon, which form a part of this specification.

The object of my invention is to provide mechanism whereby conveniently and advantageously to propel street-cars or similar vehicles in connection with and by means of a portable engine or some similar propelling-power; and the invention consists in the form and construction of the mechanism and the location and arrangement of the parts.

In the drawings, Figure 1 is an elevation of driving mechanism embodying my invention attached to the wheels and frame of a car. Fig. 2 is a plan of the same mechanism shown in Fig. 1. Figs. 3, 4, and 5 are details.

The same letters refer to like parts in all the views.

A A' are the sills or lower parts of the frames of street-cars.

B, B', and B" are the wheels supporting the cars A and A'.

C is a driving-shaft adapted to be rotated by the power-supplying mechanism. This shaft C is provided with two bell-cranks, D D', projecting from the shaft in opposite directions.

Two sprocket-wheels, F F', are supported and rotate independently of each other on an axle, G, which axle is supported in the bearings H H, affixed to the car-frame A. These sprocket-wheels are each provided with a hub rigid thereto, from each of which projects a bell-crank, I I', which bell-cranks I I' are connected with the cranks D D' by the pitmen E E'. An arm rigid to the sprocket-wheel and projecting therefrom, to which to connect pitman D, would serve the same purpose as the bell-crank I. The length of the cranks D D' is so proportioned to the length of the cranks I I' that a revolution of the cranks D D' will cause the cranks I I' to oscillate through an arc of about one-quarter or one-third of an entire circle or revolution.

The axle J is rigid in the wheels B B. Two sprocket-wheels, K K', are supported and rotate on the axle J. These sprocket-wheels K K' are each provided with drums or cases L L'— one on each side—rigid to the wheel, within each of which drums is a ratchet-wheel, M M', rigid on the axle J.

The teeth of the ratchet-wheels M M' are constructed and adapted to engage pawls in severally reverse directions. Pawls N N' are pivoted in and to each drum just outside of the wheels M M', and are adapted by gravity to engage the teeth of the wheels M M', respectively, causing the wheel on one side of each sprocket-wheel to rotate over forwardly with the sprocket-wheel when it rotates ahead, and causing the wheels on the other side of the sprocket-wheel to rotate over rearwardly with the sprocket-wheel when it rotates rearwardly.

For releasing and withholding the pawls N N' from engagement with the wheels M M', an axle, O, supported in a bracket or yoke, P, rigid on the drums L L', is provided with two opposite lever-arms, Q Q', the outer ends of which lever-arms are connected by cords or rods R R' with the pawls N N', respectively. This axle O is provided with a hand-wheel, S, by the turning of which the pawl N or N' may be raised out of contact with the wheel M or M', as desired. A friction-head, T, the stem of which passes through the yoke P, is held in contact with the axle O by a spiral spring, U, around the stem between the yoke and the head T. This friction-head T bears yieldingly against the axle O and restrains it from rotating except under power applied thereto by and through the hand-wheel S.

Chains V V', passing over the wheels F and K and over F' and K', respectively, are each constructed with links adapted to engage the teeth of the sprocket-wheels and to drive and be driven by them. It will be seen that the chains V and V' have an alternating reciprocal motion by and through the mechanism through which they are connected with the driving-shaft C, and that this reciprocal motion of the chains V and V', being alternately communicated in one direction to the axle J by and through the mechanism therefor hereinbefore described, will cause the axle to rotate constantly forward or rearward, as the axle is affixed to the sprocket-wheel K K' by the pawls N N or N' N', respectively, so that, while the movements of the chains V V' and sprocket-wheels are always the same, by reversing the engagement of the pawls N N' the axle J and wheels B B may be made to rotate over to the front or rear, as desired.

In the drawings the car-starter, W, recently patented to me is shown attached to the axle of the wheel B'', which starter is connected by a rod or cable, Y, to an arm of the wheel F', whereby the starter is operated in connection with the invention hereinbefore described.

What I claim as new, and desire to secure by Letters Patent, is—

1. In car-driving mechanism, sprocket-wheel K, rotating on the car-wheel axle J and provided with drums L L', in combination with ratchet-wheels M M', rigid on axle J, pawls N N', and chain V, running over and engaging the sprocket-wheel K and connected with the power-supplying mechanism, substantially as described.

2. In car-driving mechanism, a sprocket-wheel, F, oscillating on an axle, and provided with a rigid arm or bell-crank, I, connected with the power-supplying mechanism, in combination with a chain, V, running over and engaging with the sprocket-wheel F, and running upon and communicating motion to a wheel upon the car-axle, substantially as described.

3. The driving-shaft C, provided with opposite bell-cranks D D', pitmen E E', connecting cranks D D' with cranks I I', independent sprocket-wheels F F', provided with rigid crank-arms I I' and the chains V V', in combination with sprocket-wheels K K', each provided with two ratchet-wheels, L L', and a pawl, N N', pivoted to the sprocket-wheel, said pawls being constructed and adapted to engage either one or the other of the ratchet-wheels in reverse directions and compel rotation thereof, all substantially as described.

4. In car-driving mechanism, the power-supplying wheel K, the thereon-supported axle O and oscillating arms Q Q', connected to the pawls N N', and pawls N N', in combination with the ratchet-wheels M M', rigid on car-axle J, all substantially as described.

5. In car-driving mechanism, the sprocket-wheel F on one car, and thereto attached rod or cable Y, connecting the sprocket-wheel to a starter on the axle of another car, substantially as described.

In testimony whereof I affix my signature in presence of two witnesses.

EZRA DEDERICK.

Witnesses:
C. T. BENEDICT,
O. L. HOFFMANN.